(12) United States Patent
Kim et al.

(10) Patent No.: US 9,355,674 B2
(45) Date of Patent: May 31, 2016

(54) DATA STORAGE DEVICE AND SYSTEM HAVING ADAPTIVE BROWNOUT DETECTION

(71) Applicant: SEAGATE TECHNOLOGY LLC, Cupertino, CA (US)

(72) Inventors: Byung Wook Kim, Gyeonggi-do (KR); Jeffrey Kwak, Gyeonggi-do (KR); In Su Lee, Gyeonggi-do (KR); Jae Myung Pi, Gyeonggi-do (KR); Dong Wook Lee, Gyeonggi-do (KR); Dae Keun Ryoo, Seoul-si (KR)

(73) Assignee: Seagate Technology LLC, Cupertino, CA (US)

( * ) Notice: Subject to any disclaimer, the term of this patent is extended or adjusted under 35 U.S.C. 154(b) by 329 days.

(21) Appl. No.: 13/946,796

(22) Filed: Jul. 19, 2013

(65) Prior Publication Data

US 2015/0025821 A1 Jan. 22, 2015

(51) Int. Cl.
G11B 19/04 (2006.01)
G11B 5/02 (2006.01)

(52) U.S. Cl.
CPC ............... *G11B 19/047* (2013.01); *G11B 5/02* (2013.01)

(58) Field of Classification Search
None
See application file for complete search history.

(56) References Cited

U.S. PATENT DOCUMENTS

| | | | |
|---|---|---|---|
| 5,544,138 A * | 8/1996 | Bajorek | G11B 19/20 360/69 |
| 6,246,626 B1 | 6/2001 | Roohparvar | |
| 6,523,125 B1 * | 2/2003 | Kohno | G06F 1/3203 713/320 |
| 6,636,985 B1 * | 10/2003 | Ono | G11B 20/1816 714/42 |
| 7,274,999 B1 | 9/2007 | Saether | |
| 7,363,540 B2 * | 4/2008 | Patel | G06F 11/1435 707/999.202 |
| 7,487,392 B2 * | 2/2009 | Kawa | G11B 19/044 714/15 |
| 8,024,507 B2 * | 9/2011 | Patel | G06F 11/1435 711/102 |
| 8,296,534 B1 * | 10/2012 | Gupta | G06F 12/0804 711/103 |
| 8,362,814 B2 | 1/2013 | Dao et al. | |
| 8,458,495 B2 * | 6/2013 | Therene | G06F 11/1441 711/112 |
| 8,738,845 B2 * | 5/2014 | Patel | G06F 11/1435 707/828 |
| 8,775,758 B2 * | 7/2014 | Tomlin | 711/103 |
| 8,947,813 B2 * | 2/2015 | Chatradhi | G11B 19/2081 360/55 |
| 2014/0279877 A1 * | 9/2014 | Patel | G06F 11/1435 707/610 |

OTHER PUBLICATIONS

Huy-Binh Le, Xuan-Dien Do, Sang-Gug Lee, and Seung-Tak Ryu, "A Long Reset-Time Power-On Reset Circuit With Brown-Out Detection Capability," IEEE Transactions on Circuits and Systems—II: Express Briefs, vol. 58, No. 11, Nov. 2011.

* cited by examiner

*Primary Examiner* — Wayne Young
*Assistant Examiner* — James L Habermehl
(74) *Attorney, Agent, or Firm* — Taylor English Duma LLP (57) ABSTRACT

Technologies are described herein for adaptive brownout detection and mitigation in a storage device having rotational storage media. A target position on the rotational storage media for a current write operation is received. A value for a brownout mitigation parameter is determined based on the target position. A brownout condition is then detected on the storage device, and upon detecting the brownout condition, the current write operation is completed before a power-on reset of the storage device.

20 Claims, 6 Drawing Sheets

DATA STORAGE DEVICE AND SYSTEM HAVING ADAPTIVE BROWNOUT DETECTION

BRIEF SUMMARY

The present disclosure relates to technologies for adaptive brownout detection and mitigation in a storage device having rotational storage media, such as a hard-disk drive ("HDD") device. According to some embodiments, a method comprises receiving a target position on a rotational storage media of a storage device for a current write operation. A value for a brownout mitigation parameter is determined based on the target position. A brownout condition is then detected in the storage device, and upon detecting the brownout condition, the current write operation is completed before a power-on reset of the storage device.

According to further embodiments, a computer-readable storage medium comprises processor-executable instructions that, when executed by a processor, cause the processor to receive a target position on a rotational storage media of a storage device for a current write operation. A value for a brownout detection threshold is determined based on the target position. It is then determined whether the supply voltage level is below the value for the brownout detection threshold, and if so, a brownout detection signal is generated and the current write operation is completed.

According to further embodiments, a system comprises a hard disk drive comprising a rotational recording medium and a controller comprising a processor and a memory. The controller may be configured to receive a target position on the rotational storage media for a current write operation and determine a value for a power-on reset threshold based on the target position. The controller may then monitor the supply voltage level for the controller. If it is determined that the supply voltage level is below a configured brownout detection threshold, the controller may generate a brownout detection signal and complete the current write operation. If it is determined that the supply voltage level is below the value for the power-on reset threshold, the controller may perform a power-on reset of the controller.

According to some embodiments, a method of adaptive brownout detection and mitigation in a storage device having rotational storage media comprises receiving a target position on the rotational storage media for a current write operation. A value for a brownout detection to power-on reset delay is determined based on the target position. A brownout condition is then detected in the storage device, and upon detecting the brownout condition, a brownout detection signal is generated and the current write operation is completed. After a period of time indicated by the value for the brownout detection to power-on reset delay expires, a power-one reset of the storage device is performed.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for adaptive brownout detection and mitigation in a storage device having rotational storage media. A typical storage device may include a hard-disk drive ("HDD") device. The HDD device may contain a number of magnetic storage disks formatted into a number of concentric data tracks. The data tracks may be further divided into formatted data structures, referred to herein as "sectors," that contain the data stored on the device. The sectors may be of a predefined, fixed length and encoded with user data as well as information used for data recovery by the decoding scheme. If a sector is not completely but only partially recorded onto the disk, data recovery from the partially recorded sector may not be possible since this data recovery information may have been lost. In other words, sectors on the disks not recorded in their entirety may not be successfully read at a later time.

During a power-down of the HDD device, the supply voltage may drop and, upon reaching a certain voltage threshold, a system reset may occur to protect the device from malfunctions that may result in invalid data processing. This may be referred to as a "power-on reset." Typically, the HDD device may cease read and write operations immediately upon the power-on reset. If the power-on reset occurs during a write operation of a sector, the sector may only be partially written to the disk, resulting in data loss.

Some storage devices implement a brownout detection scheme to mitigate such data loss by protecting against write failures during power-down. In these schemes, the supply voltage level may be monitored and a warning signal, referred to as a "brownout detection signal," may be generated when the supply voltage reaches a certain level between normal supply voltage and the power-on reset threshold voltage. For example, in an HDD device with a normal supply voltage of 5 V and a power-on reset threshold of 3.5 V, the brownout detection signal may be generated when the supply voltage reaches 4.3 V. Upon generation of the brownout detection signal, the HDD device may cease accepting new write operations and proceed to complete any write operation(s) in progress. By setting the brownout detection voltage, also referred to herein as the "brownout detection threshold," to a sufficiently-higher voltage than the power-on reset threshold, a sector being written to the disk may be recorded in its entirety before the power-on reset occurs, thus avoiding data loss.

In order to accomplish mitigation of data loss due to partially written sectors, the time between brownout detection and power-on reset should be longer than the time required to complete a write of a sector on the disk. For example, if the supply voltage for an HDD device drops linearly from 5 V to 0 V in 450 µs during power-down, the power-on reset threshold is configured at 3.5 V, and the brownout detection scheme generates the brownout detection signal at 4.3 V, then time between brownout detection and power-on reset would be approximately 72 µs. If worst case time requirement for writing a sector to disk in the HDD device is less than 72 µs, then no write failures should occur during the power-down condition. However, since the HDD device ceases accepting new write operations upon the generation of the brownout detection signal, the overall operational voltage range of the device is limited by the brownout detection threshold, e.g. 4.3 V, instead of the lower power-on reset threshold, e.g. 3.5 V, without the brownout detection scheme.

In data storage devices having rotational storage media, such as the disks of the HDD device in the example above, the time required to complete a write operation of a complete data structure located near the outer radius of the storage media may be shorter than that required to write a data structure near the inner radius of the storage media due to the way in which the media is formatted. For example, for some HDD devices, the write time may be approximately 70 µs for a sector located on a data track near the innermost radius of the disk but only approximately 24 µs for a sector located on a data track near the outermost radius.

According to embodiments, an adaptive brownout detection and mitigation scheme may be implemented in a storage device that takes advantage of the difference in write times between data structures located near the outer radius and those near the inner radius of the rotational media in order to increase the operational voltage range of the device. The parameter values for the adaptive brownout detection and mitigation scheme are not fixed, but may be adjusted to increase or decrease the time between brownout detection and power-on reset based on the radial position of the target data structure on the rotational media for a current write operation. This may result in an overall increase in the operational voltage range of the device when compared to a typical brownout detection scheme with fixed parameter values while maintaining the same level protection against data loss in power-down or other low power conditions.

Figure 1:
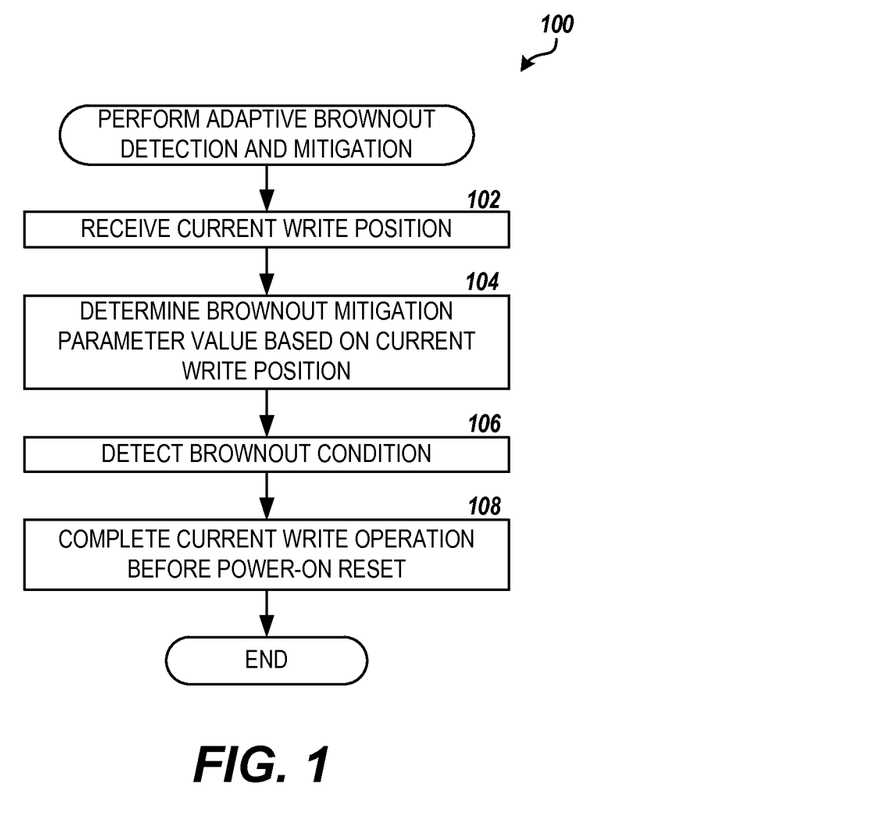
FIG. 1 is a flow diagram showing one routine for performing adaptive brownout detection and mitigation in a storage device having rotational media, according to embodiments described herein.

FIG. 1 provides an overview of adaptive brownout detection and mitigation methods and processes described herein. Specifically, FIG. 1 illustrates one routine 100 for adaptive brownout detection and mitigation in a storage device having rotational storage media, such as an HDD device, according to some embodiments. The routine 100 may be performed during a write operation in the normal operation or "user mode" of the storage device, for example. According to some embodiments, the routine 100 may be performed by a controller of the storage device. The routine 100 includes step 102, where a position of a target data structure on the storage media for a current write operation is received. The position may comprise a specification of a data track on a disk containing the target sector for the write operation, for example.

From step 102, the routine 100 proceeds to step 104, where a value is determined for at least one brownout mitigation parameter based on the position of the target sector. In some embodiments, the brownout mitigation parameter may be a brownout detection threshold, as described above. In other embodiments, the brownout mitigation parameter(s) may comprise a brownout detection threshold, a power-on reset threshold, a brownout detection to power-on reset delay or any combination of these and/or other applicable parameters, as will be described in more detail below. The value for the brownout mitigation parameter(s) may be determined by lookup from a brownout mitigation parameter table based on the position of the target sector, may be calculated based on the position of the target sector and pre-set limits, or may be determined by some other method. For example, the brownout detection threshold value may be determined to be 4.3 V for a target sector on a track near the inner radius of the disk, 3.9 V for a target sector on a track near the outer radius of the disk, and between 4.3 V and 3.9 V based on the radial position of the track of the target sector between the inner and outer radiuses of the disk, respectively.

From step 104, the routine 100 proceeds to step 106, where a brownout condition is detected in the storage device. In some embodiments, the detection of the brownout condition may be based on the value determined for the brownout mitigation parameter(s) in step 104. For example, the brownout condition may detected by the supply voltage of the controller of the storage device dropping below the brownout detection threshold value determined for the position of the target sector of the current write operation on the storage media.

The routine 100 proceeds from step 106 to step 108, where the current write operation is completed before a power-on reset occurs. According to embodiments, the value determined for the brownout mitigation parameter(s) are configured to provide sufficient time for the current write operation to complete before power-on reset occurs, as will described in more detail below in regard to FIGS. 4-6. From step 108, the routine 100 ends.

Figure 2:
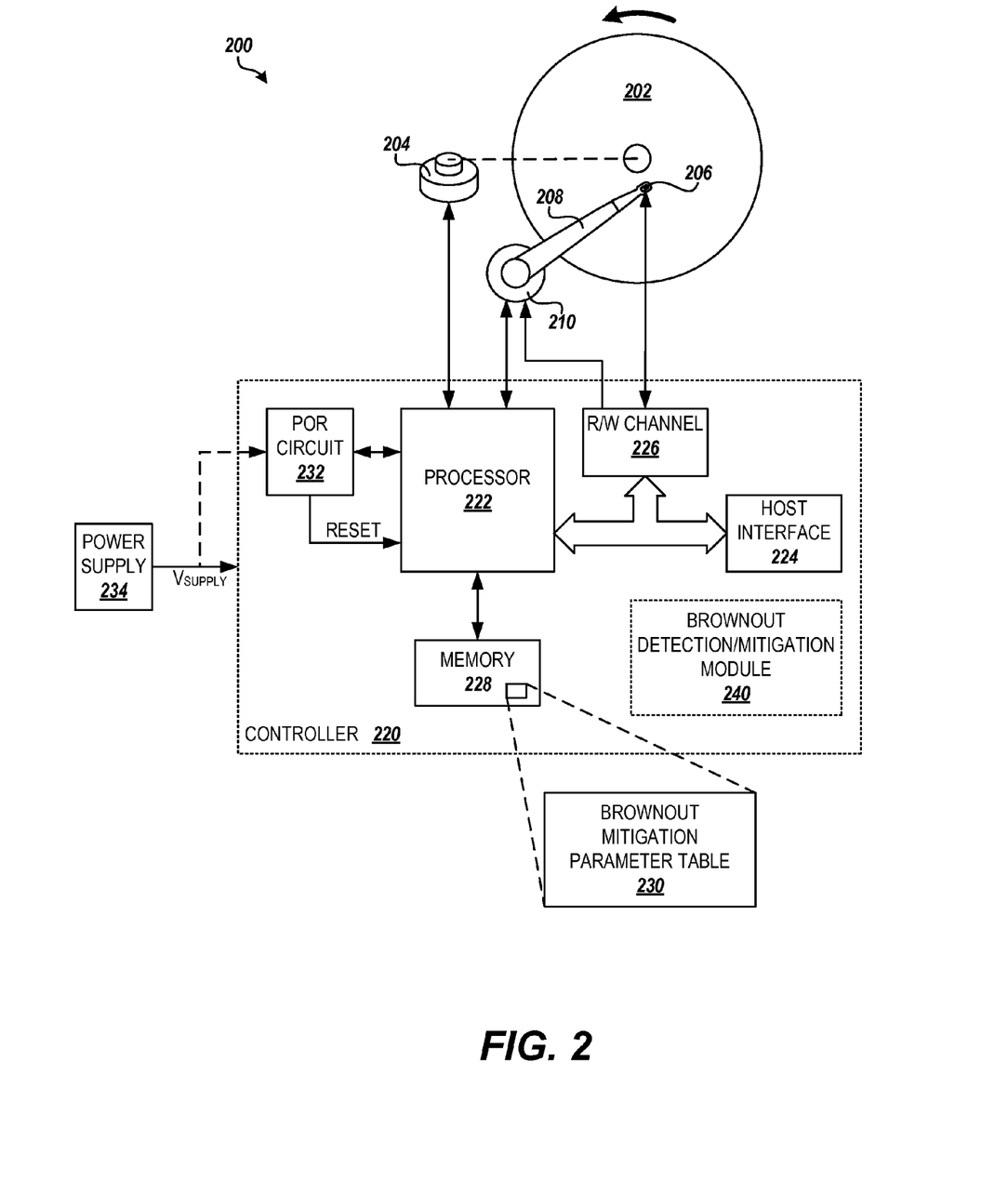
FIG. 2 is a block diagram showing an illustrative environment for adaptive brownout detection and mitigation in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD device, along with hardware, software and components for performing adaptive brownout detection and mitigation in the device, according to the embodiments provided herein. The storage device 200 may include rotational storage media comprising at least one platter or disk 202 rotatable by a spindle motor 204 and having a magnetic surface or coating.

The storage device 200 further includes at least one read/write head 206 located adjacent to the surface of each disk 202. The read/write head 206 may read information from the disk 202 by sensing a magnetic field formed on portions of the surface of the disk, and may write information to the disk by magnetizing a portion of the surface of the disk. The read/write head 206 may be located at the distal end of an arm 208, the arm being further connected to an actuator 210, such as a voice coil motor ("VCM"), that repositions the read/write head 206. It will be appreciated by one of ordinary skill in the art that the read/write head 206 may comprise multiple components, such as a magneto-resistive ("MR") or tunneling MR reader element, a writer element, an air bearing and the like.

Figure 3:
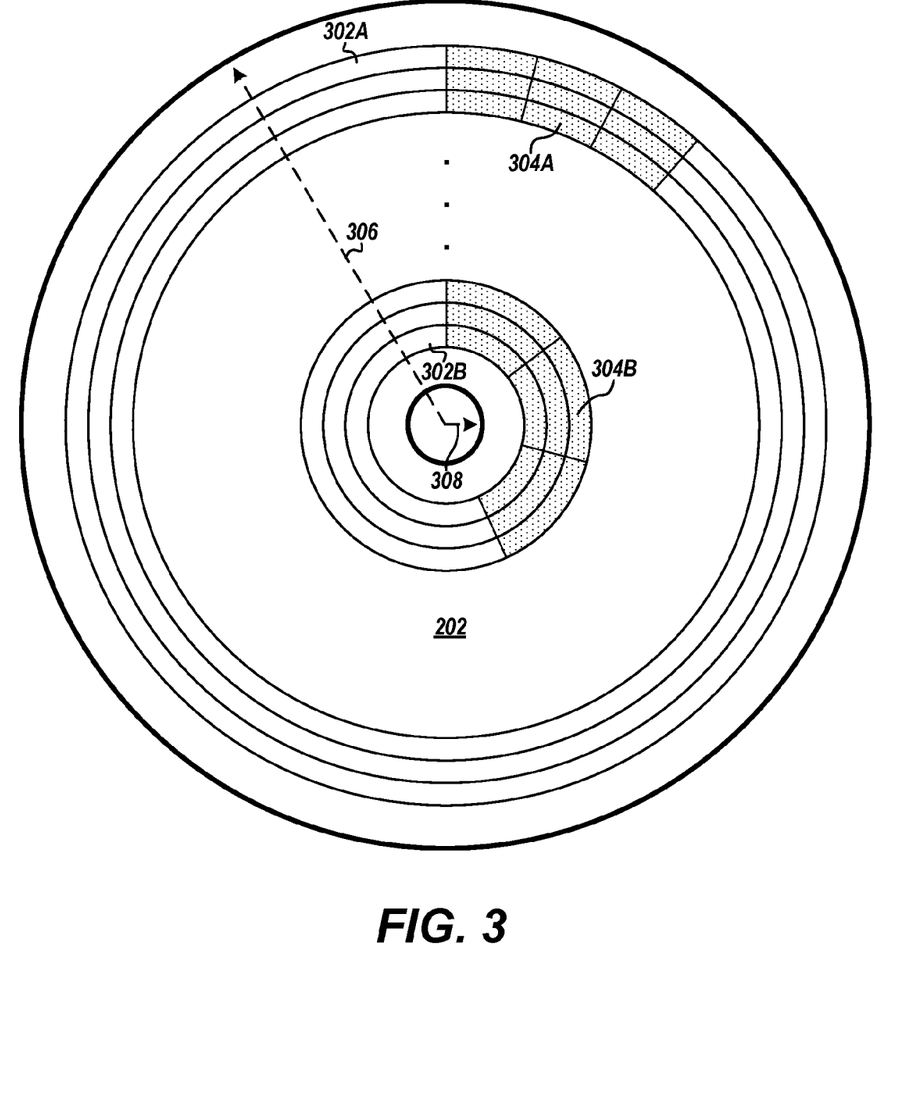
FIG. 3 is a block diagram showing an illustrative layout of data tracks and sectors on disk media, according to embodiments described herein.

The surface of the disk 202 may be divided or "formatted" into a number of individual data tracks, such as data tracks 302A and 302B (referred to herein generally as data tracks 302) shown in FIG. 3. The data tracks 302 may represent substantially concentric circular areas on the surface of the disk 202. Each data track 302 may further be divided or formatted into a number of individual data structures or "sectors," such as sectors 304A and 304B (referred to herein generally as sectors 304), for storage of user data. According to embodiments, each sector 304 may contain a fixed number of bits of data storage. For example, each sector 304 may include a fixed length preamble, 4 Kb of user data and a fixed number of bits for error correction or verification data.

In further embodiments, the number of sectors 304 per data track 302 may vary, with a greater number of sectors on the tracks towards the outer radius 306 of the disk 202 and fewer sectors on the tracks towards the inner radius 308 of the disk, as further shown in FIG. 3. It will be appreciated by one skilled in the art that when the disk 202 is maintained at a constant rotational rate during normal operation of the storage device 200, the data recording rate for the storage device can vary based on the radial position of the target data track 302, with faster writes occurring on the outer tracks, such as track 302A (where there are more sectors 304), and slower writes occurring on the inner tracks, such as track 302B (where there are fewer sectors). For example, in some HDD devices, the write time for a sector 304 of data to an outermost data track 302A may be around 24 μs, while the write time for a sector of data to an innermost data track 302B may be around 70 μs.

In addition, recording data to an outermost data track 302A may require more power than that needed for recording data to an innermost data track 302B due to the higher frequencies involved in recording the sector data in a shorter period of time. For example, some HDD devices write sector data in innermost tracks 302B at 400 Mbps, while sector data in outermost tracks 302A may be written at 1.5 Gbps, These devices may consume 1.5 W of power for writing a sector 304 to an outermost data track 302A while only consuming 0.7 W to write a sector to an innermost data track 302B.

Returning to FIG. 2, the storage device 200 may further comprise a controller 220 that controls the operations of the storage device. The controller 220 may include a processor 222 to monitor and control the operations of the storage device 200. The controller may further include a host interface 224 allowing the storage device 200 to communicate with a host device or other components, such as a server computer, personal computer ("PC"), laptop, tablet, game console, set-top box or any other electronics device that can be communicatively coupled to the storage device 200 to store and retrieve data from the storage device. The controller 220 may process write commands from the host device by formatting the associated data and transfer the formatted data via a read/write channel 226 through the read/write head 206 and to a sector 304 on a target data track 302 on the surface of the disk 202. The controller 220 may further process read commands from the host device by determining the target data track 302 and sector 304 containing the desired data, moving the read/write head(s) 206 over the determined location, reading the data from the target sector via the read/write channel 226, correcting any errors and formatting the data for transfer to the host device.

The read/write channel 226 may convert data between the digital signals received by the host interface 224 and/or processed by the processor 222 and the analog signals conducted through the read/write head 206 for reading and writing data to the surface of the disk 202. The analog signals to and from the read/write head 206 may be further processed through a pre-amplifier circuit. The read/write channel 226 may further provide servo data read from the disk 202 to the actuator 210 to position the read/write head 206. The read/write head 206 may be positioned to read or write data to the target sector 304 on the surface of the disk 202 by moving the read/write head 206 radially across the data tracks 302 using the actuator 210 while the spindle motor 204 rotates the disk to bring the target sector under the read/write head.

The controller 220 may further include a computer-readable storage medium or "memory" 228 for storing processor-executable instructions, data structures and other information. The memory 228 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 228 may further comprise a portion of the storage media of the storage device 200, such as the maintenance cylinder ("M/C") of the disk 202. For example, the memory 228 may store a firmware that comprises commands and data necessary for performing the operations of the storage device 200. According to some embodiments, the memory 228 may store processor-executable instructions that, when executed by the processor, perform the routines 100, 400, 500 and 600 for performing adaptive brownout detection and mitigation in the storage device 200, as described herein.

In some embodiments, the memory 228 may store a brownout mitigation parameter table 230. The brownout mitigation parameter table 230 may store parameter information regarding parameter values utilized by the methods and processes described herein for adaptive brownout detection and mitigation in the storage device 200, as will be described in more detail below in regard to FIGS. 4-6. In other embodiments, the brownout mitigation parameter table 230 may be stored in some other computer-readable storage media in or accessible to the controller 220, including in the M/C of the disk 202.

In addition to the memory 228, the environment may include other computer-readable media storing program modules, data structures and other data described herein for performing adaptive brownout detection and mitigation in the storage device 200. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

The storage device may further include a power-on reset ("PoR") circuit 232. The PoR circuit 232 may monitor the supply voltage ($V_{SUPPLY}$) provided by a power supply 234 to the controller 220, provide power-on reset functionality for the processor 222 and other components of the controller 220, and perform other power supervisory functions. According to embodiments, the PoR circuit 232 may be configured to detect when the supply voltage falls below a voltage threshold, referred to herein as the "power-on reset threshold," and assert a reset signal to the processor 222 and/or other components of the controller 220 in order to reset the processor and other components to a known, stable state. The power-on reset threshold may be fixed at particular value, such 3.5 V, or the power-on reset threshold may be configurable by the processor 222 or other component of the controller 220.

In further embodiments, the environment may include a brownout detection/mitigation module 240. The brownout detection/mitigation module 240 may perform the methods and processes described herein for performing adaptive brownout detection and mitigation in the storage device 200. According to some embodiments, the brownout detection/mitigation module 240 may be implemented in the controller 220 as software, hardware or any combination of the two. For example, the brownout detection/mitigation module 240 may be stored in the memory 228 as part of the firmware of the storage device 200 and may be executed by the processor 222 for performing the methods and processes described herein. The brownout detection/mitigation module 240 may alternatively or additionally be stored in other computer-readable media accessible by the controller 220.

It will be appreciated that the structure and/or functionality of the storage device 200 may be different that that illustrated in FIG. 2 and described herein. For example, the processor 222, read/write channel 226, memory 228, PoR circuit 232, power supply 234 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 4:
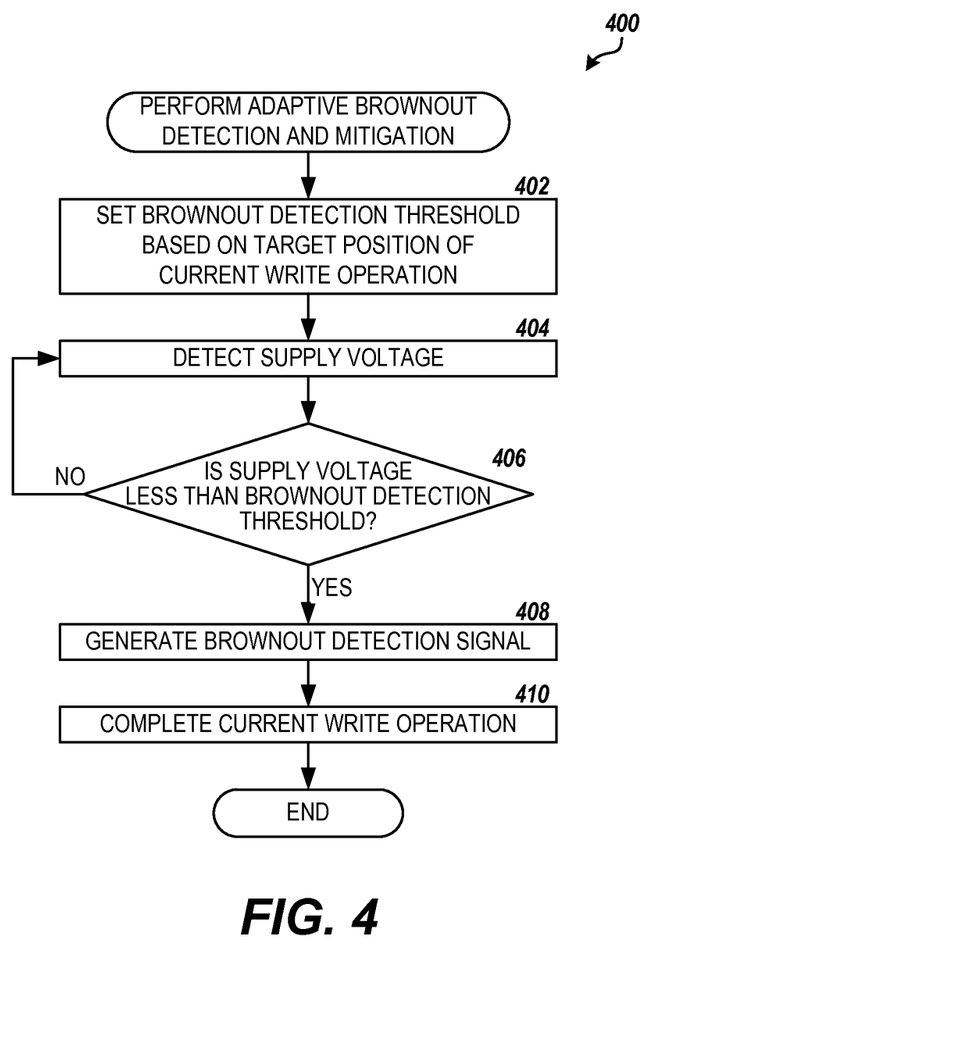
FIG. 4 is a flow diagram showing another routine for performing adaptive brownout detection and mitigation in a storage device, according to embodiments described herein.

FIG. 4 illustrates one routine 400 for performing adaptive brownout detection and mitigation in a storage device 200 having rotational media, according to some embodiments. According to embodiments, the routine 400 may be performed in conjunction with a current write operation of a target sector 304 on a target data track 302 of the disk 202 during user mode operation of the storage device 200. In some embodiments, the routine 400 may be performed by the brownout detection/mitigation module 240 described above in regard to FIG. 2. In further embodiments, the routine 400 may be performed by the controller 220 of the storage device 200, by external processors or computing systems accessing data from the device or some other combination of modules, processors and devices.

The routine 400 begins at step 402, where the brownout detection/mitigation module 240 sets a value for the brownout detection threshold based on the target position of the current write operation. The value for the brownout detection threshold may be configured to provide sufficient time between detection of the brownout condition and power-on reset for the current write operation to complete. In some embodiments the brownout detection threshold value may be determined based on a combination of a number of factors, including the normal supply voltage of the storage device 200, the configured power-on reset threshold, the rate of drop in supply voltage in a power-down of device, the typical write time of a sector 304 on the target data track 302 and the like. These factors may be determined for the storage device 200 during design or manufacturer of the device and/or during a "burn-in" or certification ("CERT") processing of the storage device, for example.

For example, an HDD device may have a normal supply voltage of 5 V, a power-on reset threshold configured at 3.5 V, and a typical time for supply voltage drop to 0 V at power-down of 450 μs linearly. Further, the write time for the HDD device may be approximately 70 μs for a sector 304 located on a data track 302 near the inner radius 308 of the disk 202 and approximately 24 μs for a sector located on a data track near the outer radius 306 of the disk. For this HDD device, the brownout detection threshold may be set at a value of 4.3 V for a target data track 302 near the inner radius 308 of the disk 202, at a value of 3.9 V for a target track near the outer radius 306 of the disk, and at a value between 4.3 V and 3.9 V for target tracks between the inner and outer radiuses of the disk, respectively.

In some embodiments, the value for the brownout detection threshold may be determined by lookup from the brownout mitigation parameter table 230 described in regard to FIG. 2 based on the radial position of the target track 302. For example, the data tracks 302 of the disk 202 may be grouped into a number of zones, with the data tracks in each zone containing the same number of sectors 304. The brownout mitigation parameter table 230 may contain an entry for each zone with a corresponding value for the brownout detection threshold for target data tracks 302 within that zone in a form shown below in TABLE 1:

TABLE 1

Storage of Brownout Detection Threshold Values

| Zone ID | Brownout Detection Threshold Voltage |
|---------|--------------------------------------|
| 0       | 4.30 V                               |
| 1       | 4.12 V                               |
| ...     | ...                                  |
| N       | 3.90 V                               |

The entries in the brownout mitigation parameter table 230 may be determined based on the normal supply voltage of the storage device 200, the configured power-on reset threshold, the typical or worst case rate of drop in supply voltage in a power-down of the storage device, and the typical write time of a sector 304 on a data track 302 in each zone, for example. In further embodiments, the entries in the brownout mitigation parameter table 230 may correspond to various ranges of data tracks 302, to individual tracks or to some other identifier of the target data track. The entries in the brownout mitigation parameter table 230 may be determined during design and/or or CERT processing of the storage device 200, and written into the table stored in the non-volatile memory 228, the M/C of the disk 202 or other storage area of the device.

It will be appreciated by one skilled in the art that the tabular data shown in the tables herein is provided for illustrative purposes only, and that the brownout mitigation parameter table 230 may represent a data file, a database table, an object stored in a computer memory, a programmatic structure or any other data container commonly known in the art. Each data element included in the data structure may represent one or more fields in a data file, one or more columns of a database table, one or more attributes of an object, one or more member variables of a programmatic structure or any other unit of data of a data structure commonly known in the art. The implementation is a matter of choice, and may depend on the technology, performance and other requirements of the processor 222, controller 220 or other elements of the storage device 200 in which the data structures are implemented. It will be further appreciated that the entries in the brownout mitigation parameter table 230 may contain additional data elements beyond those shown in the tables and described herein.

In further embodiments, the value for the brownout detection threshold may be calculated in real-time based on the radial position of the target data track 302 between the inner radius 308 and outer radius 306 of the disk 202 and maximum and minimum brownout detection threshold values determined for the storage device 200. It will be further appreciated that the value for the brownout detection threshold may be determined by any number of methods known in the art and based on any number of factors beyond those described herein, and it is intended that all such methods and factors be included in this application.

From step 402, the routine 400 proceeds to step 404, where the brownout detection/mitigation module 240 detects the current supply voltage level of the storage device 200. In some embodiments, the current supply voltage level may be determined by querying the PoR circuit 232. In other embodiments, the current supply voltage level may be detected directly from the power supply 234 or through another method. Next, the routine 400 proceeds to step 406, where the brownout detection/mitigation module 240 determines if the supply voltage level is less than the brownout detection threshold value set for the current write operation in step 402. If the supply voltage level is not less than the brownout detection threshold value set for the current write operation, the routine 400 returns to step 404, where the brownout detection/mitigation module 240 continues to monitor the current supply voltage level of the storage device 200.

If the supply voltage level is less than the brownout detection threshold value set for the current write operation, the routine 400 proceeds from step 406 to step 408, where the brownout detection/mitigation module 240 generates a brownout detection signal in the controller 220 of the storage device 200. As described above, upon generation of the brownout detection signal, the storage device 200 may cease accepting new write operations, according to some embodiments.

From step 408, the routine 400 proceeds to step 410, where the current write operation is completed. As described above, the value for the brownout detection threshold determined in step 402 is configured to provide sufficient time after detection of the brownout condition to complete the write of the target sector 304 in its entirety to the disk 202 before power-on reset. In this way, data loss due to partial or incompletely written sectors 304 can be avoided while allowing for the widest overall operational voltage range of the storage device 200. From step 410, the routine 400 ends.

Figure 5:
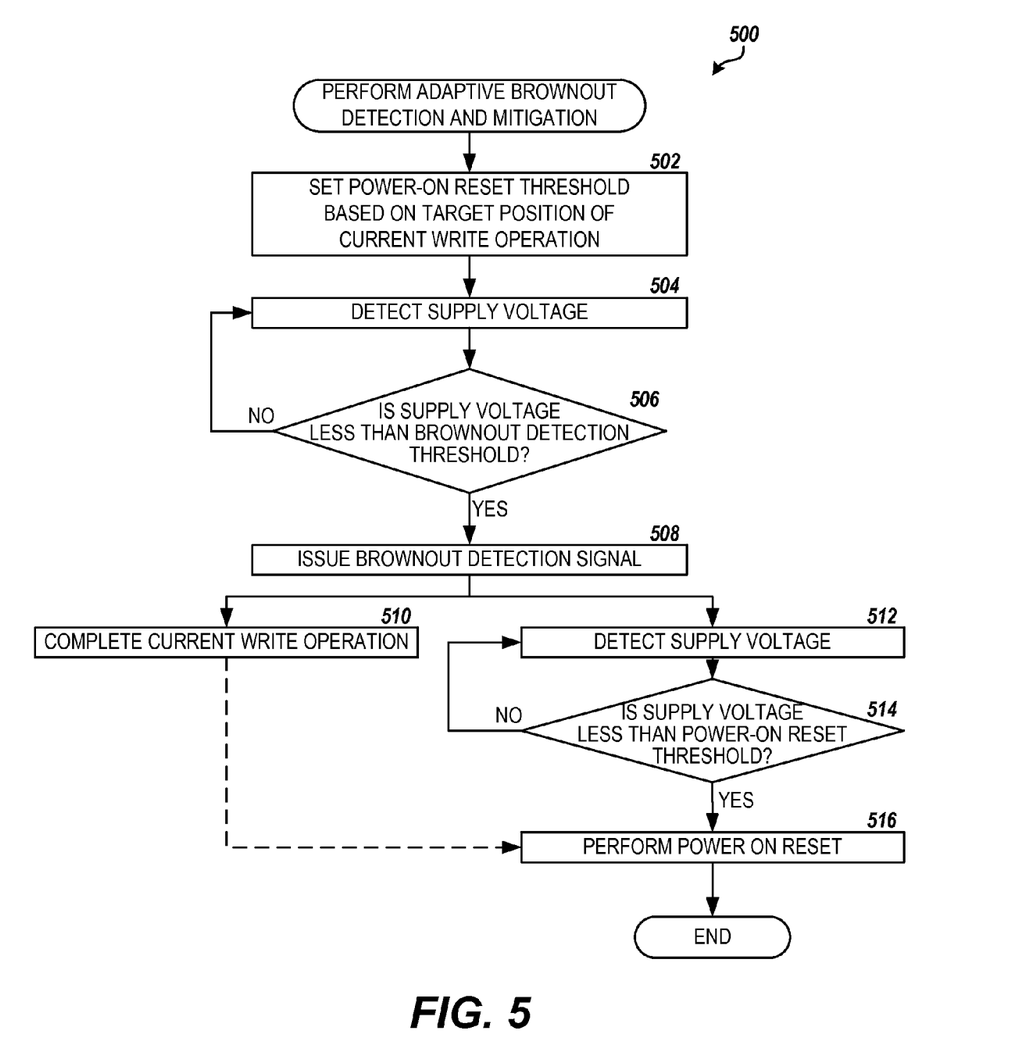
FIG. 5 is a flow diagram showing another routine for performing adaptive brownout detection and mitigation in a storage device, according to embodiments described herein.

FIG. 5 illustrates another routine 500 for performing adaptive brownout detection and mitigation in a storage device 200 having rotational media, according to some embodiments. Similarly to routine 400 described above, the routine 500 may be performed in conjunction with a current write operation of a target sector 304 on a target data track 302 of the disk 202 during user mode operation of the storage device 200. In some embodiments, the routine 500 may be performed by the brownout detection/mitigation module 240 in conjunction with the PoR circuit 232 described above in regard to FIG. 2. In further embodiments, the routine 500 may be performed by the controller 220 of the storage device 200, by external processors or computing systems accessing data from the device or some other combination of modules, processors and devices.

The routine 500 begins at step 502, where the brownout detection/mitigation module 240 sets a value for the power-on reset threshold based on the target position of the current write operation. The value for the power-on reset threshold may be set by the brownout detection/mitigation module 240 by sending a signal to the PoR circuit 232, for example. The value for the power-on reset threshold may be configured to provide sufficient time between detection of a brownout condition and power-on reset for the current write operation to complete. By setting the power-on reset threshold to lower levels for target data tracks 302 near the inner radius 308 of the disk 202, more time can be provided for write operations targeting inner tracks to complete before power-on reset occurs. This scheme is further beneficial in circumstances where the power consumption for writing data to outermost data tracks 302A of the disk 202 is higher than that required for innermost data tracks 302B, as described above in regard to FIG. 3. By setting higher power-on reset voltage levels when writing to outermost data tracks 302A, power stability can be guaranteed for outer radius recording requiring higher power consumption without losing data loss protection for slower write times for innermost data tracks 302B.

In some embodiments the power-on reset threshold value may be determined based on a combination of a number of factors, including the normal supply voltage of the storage device 200, the configured brownout detection threshold, rate of drop in supply voltage in a power-down of the device, the typical write time of a sector 304 on the target data track 302 and the like. As described above, these factors may be determined for the storage device 200 during design and/or CERT processing of the device.

For example, an HDD device may have a normal supply voltage of 5 V, a brownout detection threshold configured at 4.3 V, and a typical time for supply voltage drop to 0 V at power-down of 280 µs linearly. Further, the write time for the HDD device may be approximately 70 µs for a sector 304 located on a data track 302 near the inner radius 308 of the disk 202 and approximately 24 µs for a sector located on a data track near the outer radius 306 of the disk. For this HDD device, the power-on reset threshold may be set at a value of 3.0 V for a target data track 302 near the inner radius 308 of the disk 202, at a value of 3.5 V for a target track near the outer radius 306 of the disk, and at a value between 3.0 V and 3.5 V for target tracks between the inner and outer radiuses of the disk, respectively.

In some embodiments, the value for the power-on reset threshold may be determined by lookup from the brownout mitigation parameter table 230 based on the radial position of the target track 302. For example, similar to the example described above in regard to TABLE 1, the brownout mitigation parameter table 230 may contain an entry for each zone with a corresponding value for the power-on reset threshold for target data tracks 302 within that zone in a form shown below in TABLE 2:

TABLE 2

| Storage of Power-On Reset Threshold Values | |
|---|---|
| Zone ID | Power-on Reset Threshold Voltage |
| 0 | 3.00 V |
| 1 | 3.12 V |
| ... | ... |
| N | 3.50 V |

The entries in the brownout mitigation parameter table 230 may be determined based on the normal supply voltage of the storage device 200, the configured brownout detection threshold, the rate of drop in supply voltage in a power-down of the device, and the typical write time of a sector 304 on a data track 302 in each zone, for example. In further embodiments, the value for the power-on threshold may be calculated in real-time based on the radial position of the target data track 302 between the inner radius 308 and outer radius 306 of the disk and minimum and maximum power-on reset threshold values determined for the storage device 200. It will be further appreciated that the value for the power-on reset threshold may be determined by any number of methods known in the art and based on any number of factors beyond those described herein, and it is intended that all such methods and factors be included in this application.

From step 502, the routine 500 proceeds to step 504, where the brownout detection/mitigation module 240 detects the current supply voltage level of the storage device 200. In some embodiments, the current supply voltage level may be determined by querying the PoR circuit 232. In other embodiments, the current supply voltage level may be detected directly from the power supply 234 or through another method. Next, the routine 500 proceeds to step 506, where the brownout detection/mitigation module 240 determines if the supply voltage level is less than the configured brownout detection threshold value. If the supply voltage level is not less than the configured brownout detection threshold, the routine 500 returns to step 504, where the brownout detection/mitigation module 240 continues to monitor the current supply voltage level of the storage device 200.

If the supply voltage level is less than the configured brownout detection threshold, the routine 500 proceeds from step 506 to step 508, where the brownout detection/mitigation module 240 generates a brownout detection signal in the controller 220 of the storage device 200. As described above, upon generation of the brownout detection signal, the storage device 200 may cease accepting new write operations, according to some embodiments.

From step 508, the routine 500 proceeds to step 510, where the current write operation is completed. While the current write operation completes, the PoR circuit 232 may detect the current supply voltage level of the storage device, at step 512. The routine proceeds from step 512 to step 514, where the PoR circuit determines if the supply voltage level is less than the power-on reset threshold value set for the current write operation in step 502. If the supply voltage level is not less than the power-on reset threshold value set for the current write operation, the routine 500 returns to step 512, where the PoR circuit 232 continues to monitor the current supply voltage level of the storage device 200.

If the supply voltage level is less than the power-on reset threshold value set for the current write operation, the routine 500 proceeds from step 514 to step 516, where the PoR circuit 232 performs a power-on reset of the controller 220 of the storage device 200. As described above, the value for the power-on reset threshold determined in step 502 is configured to provide sufficient time after detection of the brownout condition to complete the write of the target sector 304 in its entirety to the disk 202 before power-on reset. In this way, data loss due to partial or incompletely written sectors 304 can be avoided while providing for sufficient power to complete the current write operation. From step 516, the routine 500 ends.

Figure 6:
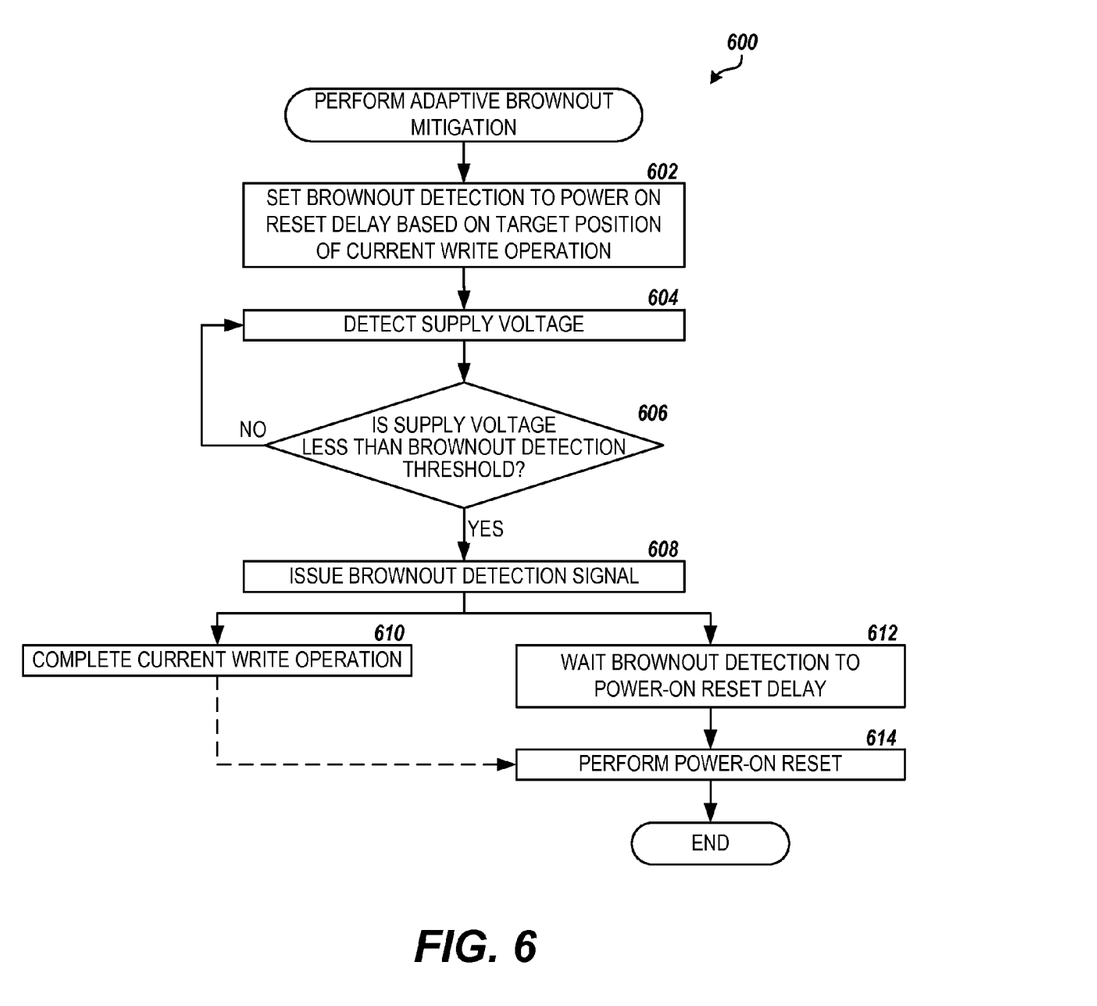
FIG. 6 is a flow diagram showing another routine for performing adaptive brownout detection and mitigation in a storage device, according to embodiments described herein.

FIG. 6 illustrates another routine 600 for performing adaptive brownout detection and mitigation in a storage device 200 having rotational media, according to some embodiments. Similarly to routines 400 and 500 described above, the routine 600 may be performed in conjunction with a current write operation of a target sector 304 on a target data track 302 of the disk 202 during user mode operation of the storage device 200. In some embodiments, the routine 600 may be performed by the brownout detection/mitigation module 240 described above in regard to FIG. 2. In further embodiments, the routine 600 may be performed by the controller 220 of the storage device 200, by external processors or computing systems accessing data from the device or some other combination of modules, processors and devices.

The routine 600 begins at step 602, where the brownout detection/mitigation module 240 sets a value for a brownout detection to power-on reset delay based on the target position of the current write operation. According to embodiments, the brownout detection to power-on reset delay represents a delay after a brownout condition is detected until a power-on reset is performed. The value for the brownout detection to power-on reset delay may be configured to provide sufficient time for the current write operation to complete. However, if brownout detection to power-on reset delay is too long and/or the supply voltage drop during power-down is too rapid, the power-on reset may occur at a lower supply voltage level than that required to guarantee power stability in the storage device 200. By setting the brownout detection to power-on reset delay to shorter intervals for target data tracks 302 near the outer radius 306 of the disk 202, the power-on reset will occur at a higher supply voltage level ensuring power stability for outer radius recording requiring higher power consumption without losing data loss protection for slower write times for innermost data tracks.

In some embodiments the brownout detection to power-on reset delay value may be set to a value greater than the typical write time of a sector 304 on the target data track 302. As described above, this time may be determined for the storage device 200 during design and/or CERT processing of the storage device. For example, an HDD device may have a write time of approximately 70 µs for a sector 304 located on a data track 302 near the inner radius 308 of the disk 202 and of approximately 24 µs for a sector located on a data track near the outer radius 306 of the disk. For this HDD device, the brownout detection to power-on reset delay may be set at 72 µs for a target data track 302 near the inner radius 308 of the disk 202, at a value of 25 µs for a target track near the outer radius 306 of the disk, and at a value between 72 µs and 25 µs for target tracks between the inner and outer radiuses of the disk, respectively.

In some embodiments, the value for the brownout detection to power-on reset delay may be determined by lookup from the brownout mitigation parameter table 230 based on the radial position of the target track 302. For example, similar to the example described above in regard to TABLE 1, the brownout mitigation parameter table 230 may contain an entry for each zone with a corresponding value for the brownout detection to power-on reset delay for target data tracks 302 within that zone in a form shown below in TABLE 3:

TABLE 3

Storage of Brownout Detection to Power-On Reset Delay Values

| Zone ID | Brownout Detection to Power-On Reset Delay |
|---|---|
| 0 | 72 µs |
| 1 | 68 µs |
| ... | ... |
| N | 25 µs |

The entries in the brownout mitigation parameter table 230 may be determined based on the typical write time of a sector 304 on a data track 302 in each zone, for example. In further embodiments, the value for the brownout detection to power-on reset delay may be calculated in real-time based on the radial position of the target data track 302 between the inner radius 308 and outer radius 306 of the disk and maximum and minimum brownout detection to power-on reset delay values determined for the storage device 200. It will be further appreciated that the value for the brownout detection to power-on reset delay may be determined by any number of methods known in the art and based on any number of factors beyond those described herein, and it is intended that all such methods and factors be included in this application.

From step 602, the routine 600 proceeds to step 604, where the brownout detection/mitigation module 240 detects the current supply voltage level of the storage device 200. In some embodiments, the current supply voltage level may be determined by querying the PoR circuit 232. In other embodiments, the current supply voltage level may be detected directly from the power supply 234 or through another method. Next, the routine 600 proceeds to step 606, where the brownout detection/mitigation module 240 determines if the supply voltage level is less than the configured brownout detection threshold value, such as 4.3 V. If the supply voltage level is not less than the configured brownout detection threshold, the routine 600 returns to step 604, where the brownout detection/mitigation module 240 continues to monitor the current supply voltage level of the storage device 200.

If the supply voltage level is less than the configured brownout detection threshold, the routine 600 proceeds from step 606 to step 608, where the brownout detection/mitigation module 240 generates a brownout detection signal in the controller 220 of the storage device 200. As described above, upon generation of the brownout detection signal, the storage device 200 may cease accepting new write operations, according to some embodiments.

From step 608, the routine 600 proceeds to step 610, where the current write operation is completed. While the current write operation completes, the routine 600 waits the brownout detection to power-on reset delay period set for the current write operation in step 602, as shown at step 612. The delay may be implemented by the brownout detection/mitigation module 240, the PoR circuit 232, the processor 222 or some other module or component of the controller 220. Upon expiration of the brownout detection to power-on reset delay, the routine proceeds from step 612 to step 614, where the PoR circuit 232 performs a power-on reset of the controller 220 of the storage device 200. As described above, the value for the brownout detection to power-on reset delay determined in step 602 is configured to provide sufficient time after detection of the brownout condition to complete the write of the target sector 304 in its entirety to the disk 202 before power-on reset. In this way, data loss due to partial or incompletely written sectors 304 can be avoided while providing for sufficient power to complete the write. From step 614, the routine 600 ends.

Based on the foregoing, it will be appreciated that technologies for adaptive brownout detection and mitigation in a storage device having rotational storage media are presented herein. While embodiments are described herein in regard to an HDD device, it will be appreciated that the embodiments described in this disclosure may be utilized in any storage device containing data stored in sector units in substantially concentric data tracks on rotational storage media, including but not limited to, a magnetic disk drive, a hybrid magnetic and solid state drive, an optical disk storage device and the like. The above-described embodiments are merely possible examples of implementations, merely set forth for a clear understanding of the principles of the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
receiving a target position on a rotational storage media of a storage device for a current write operation;
determining a value for a brownout mitigation parameter based on the target position;
detecting a brownout condition in the storage device; and
upon detecting the brownout condition in the storage device, completing the current write operation before a power-on reset of the storage device.

2. The method of claim 1, wherein the value determined for the brownout mitigation parameter is configured to provide sufficient time between detection of the brownout condition and the power-on reset of the storage device for the current write operation to complete.

3. The method of claim 1, wherein the value for the for the brownout mitigation parameter is based on one or more of a normal supply voltage of the storage device, a configured brownout detection threshold, a configured power-on reset threshold, a rate of drop in supply voltage in a power-down of the storage device, and a typical write time of a data structure at the target position on the rotational storage media.

4. The method of claim 1, wherein the brownout mitigation parameter comprises a brownout detection threshold, and wherein detecting the brownout condition in the storage device further comprises:
detecting a supply voltage level for the storage device; and
determining whether the supply voltage level is below the value for the brownout detection threshold.

5. The method of claim 4, wherein the value determined for the brownout detection threshold is less for target positions closer to an outer radius of the rotational storage media than for target positions closer to an inner radius of the rotational storage media.

6. The method of claim 1, wherein the brownout mitigation parameter comprises a brownout detection to power-on reset delay, the method further comprising the steps of:
waiting a period of time indicated by the value of the brownout detection to power-on reset delay; and
upon expiration of the period of time, performing the power-on reset of the storage device.

7. The method of claim 6, wherein the value determined for the brownout detection to power-on reset delay is based on a typical write time of a data structure at the target position on the rotational storage media.

8. The method of claim 6, wherein the value determined for the brownout detection to power-on reset delay is greater for target positions closer to an outer radius of the rotational storage media than for target positions closer to an inner radius of the rotational storage media.

9. The method of claim 1, wherein the brownout mitigation parameter comprises a power-on reset threshold, the method further comprising the steps of:
detecting a supply voltage level for the storage device;
determining whether the supply voltage level is below the value for the power-on reset threshold; and
upon determining that the supply voltage level is below the value for the power-on reset threshold, performing the power-on reset of the storage device.

10. The method of claim 9, wherein the value determined for the power-on reset threshold is less for target positions closer to an inner radius of the rotational storage media than for target positions closer to an outer radius of the rotational storage media.

11. A non-transitory computer-readable storage medium having processor-executable instructions stored thereon that, when executed by a processor, cause the processor to:
receive a target position on a rotational storage media of a storage device for a current write operation;
determine a value for a brownout detection threshold based on the target position;
detect a supply voltage level for the storage device; and
determine whether the supply voltage level is below the value for the brownout detection threshold; and
upon determining that the supply voltage level is below the value for the brownout detection threshold, generate a brownout detection signal and complete the current write operation.

12. The computer-readable storage medium of claim 11, wherein the value for the brownout detection threshold is based on one or more of a normal supply voltage of the storage device, a configured power-on reset threshold, a rate of drop in supply voltage in a power-down of the storage device, and a typical write time of a data structure at the target position on the rotational storage media.

13. The computer-readable storage medium of claim 11, wherein the value determined for the brownout detection threshold is less for target positions closer to an outer radius of the rotational storage media than for target positions closer to an inner radius of the rotational storage media.

14. The computer-readable storage medium of claim 11, wherein the value for the brownout detection threshold is retrieved from an entry in a brownout mitigation parameter table stored in a memory of the storage device, the entry corresponding to the target position on the rotational storage media.

15. The computer-readable storage medium of claim 11, wherein generating the brownout detection signal causes the storage device to stop accepting new write operations.

16. A system comprising:
a hard disk drive comprising rotational storage media; and
a controller comprising a processor and a memory, the controller configured to
receive a target position on the rotational storage media for a current write operation,
determine a value for a power-on reset threshold based on the target position,
detect a supply voltage level for the controller,
determine whether the supply voltage level is below a configured brownout detection threshold,
upon determining that the supply voltage level is below the configured brownout detection threshold, generate a brownout detection signal and complete the current write operation,
determining whether the supply voltage level is below the value for the power-on reset threshold, and
upon determining that the supply voltage level is below the value for the power-on reset threshold, performing a power-on reset of the controller.

17. The system of claim 16, wherein the value for the power-on reset threshold is based on one or more of a normal supply voltage of the controller, the configured brownout detection threshold, a rate of drop in supply voltage in a power-down of the controller, and a typical write time of a data structure at the target position on the rotational storage media.

18. The system of claim 16, wherein the value determined for the power-on reset threshold is less for target positions closer to an inner radius of the rotational storage media than for target positions closer to an outer radius of the rotational storage media.

19. The system of claim 16, wherein the value for the power-on reset threshold is retrieved from an entry in a brownout mitigation parameter table stored in the memory, the entry corresponding to the target position on the rotational storage media.

20. The system of claim 16, wherein determining whether the supply voltage level is below the value for the power-on reset threshold and performing the power-on reset of the controller are performed by a power-on reset circuit configured with the power-on reset threshold by the controller.

* * * * *